United States Patent [19]
Walters

[11] Patent Number: 5,826,323
[45] Date of Patent: Oct. 27, 1998

[54] METHOD OF MAKING A HEIGHT COMPENSATED LAMINAR STACK

[75] Inventor: Harry J. Walters, Pittsburgh, Pa.

[73] Assignee: Oberg Industries, Inc., Freeport, Pa.

[21] Appl. No.: 852,017

[22] Filed: May 6, 1997

Related U.S. Application Data

[63] Continuation-in-part of Ser. No. 782,985, Jan. 14, 1997.

[51] Int. Cl.$^6$ ................................................. H02K 15/04
[52] U.S. Cl. ............................... 29/593; 29/596; 29/598; 29/609; 29/564.6; 29/564.7
[58] Field of Search ............................ 29/596, 598, 593, 29/609, 564.1, 564.2, 564.6, 564.7; 310/216–218

[56] References Cited

U.S. PATENT DOCUMENTS

| | | |
|---|---|---|
| 3,202,851 | 8/1965 | Zimmerle et al. . |
| 4,538,345 | 9/1985 | Diederichs . |
| 4,619,028 | 10/1986 | Neuenschwander . |
| 5,349,741 | 9/1994 | Neuenschwander . |

Primary Examiner—Carl E. Hall
Attorney, Agent, or Firm—Buchanan Ingersoll, P.C.

[57] ABSTRACT

An apparatus and method for manufacturing laminated parts from a plurality of laminas, in which the laminas for forming the laminated parts are blanked from strip stock material. The laminas and are then cut and stacked to form the laminated part. The apparatus includes a measuring device, such as a linear variable differential transducer, for measuring the thickness of successive sections of the strip stock. A controller, such as a computer or a programmable logic controller, receives the thickness value of the strip stock sections from the measuring device. The desired stack height is inputted into the controller, as well as a protuberance or dimple height. A punching device, such as one or more front and rear slide operated punches, is also included which is activated by the controller to provide a protuberance at selected locations upon the strip stock sections. Respective air valves and cylinders may operatively connect to each punch to cause the punch to impart a protuberance upon receipt of an appropriate signal from the controller. The location and number of the protuberances within the stack is determined as a function of the desired stack height, the thickness of the strip stock material and the predetermined protuberance height.

7 Claims, 9 Drawing Sheets

MIN STACK HEIGHT___0.366
MAX STACK HEIGHT___0.388
MIN LAM THKNS___0.0165
MAX LAM THKNS___0.0205

MAT'L THKNS___0.0185 IN.
MAT'L TOL (+/-)___0.002 IN.

| LAM THKNS. NOM | # OF LAMS | STACK HEIGHT NOM | | TARGET MAX HEIGHT | TARGET MIN HEIGHT |
|---|---|---|---|---|---|
| 0.01650 | 23 | 0.3795 | | 0.388 | 0.366 |
| 0.01660 | 23 | 0.3818 | | 0.388 | 0.366 |
| 0.01670 | 23 | 0.3841 | | 0.388 | 0.366 |
| 0.01680 | 23 | 0.3864 | | 0.388 | 0.366 |
| 0.01690 | 22 | 0.3718 | | 0.388 | 0.366 |
| 0.01700 | 22 | 0.3740 | | 0.388 | 0.366 |
| 0.01710 | 22 | 0.3762 | | 0.388 | 0.366 |
| 0.01720 | 22 | 0.3784 | | 0.388 | 0.366 |
| 0.01730 | 22 | 0.3806 | | 0.388 | 0.366 |
| 0.01740 | 22 | 0.3828 | | 0.388 | 0.366 |
| 0.01750 | 22 | 0.3850 | | 0.388 | 0.366 |
| 0.01760 | 22 | 0.3872 | | 0.388 | 0.366 |
| 0.01770 | 21 | 0.3717 | | 0.388 | 0.366 |
| 0.01780 | 21 | 0.3738 | | 0.388 | 0.366 |
| 0.01790 | 21 | 0.3759 | | 0.388 | 0.366 |
| 0.01800 | 21 | 0.3780 | | 0.388 | 0.366 |
| 0.01810 | 21 | 0.3801 | | 0.388 | 0.366 |
| 0.01820 | 21 | 0.3822 | | 0.388 | 0.366 |
| 0.01830 | 21 | 0.3843 | | 0.388 | 0.366 |
| 0.01840 | 21 | 0.3864 | | 0.388 | 0.366 |
| 0.01850 | 20 | 0.3700 | | 0.388 | 0.366 |
| 0.01860 | 20 | 0.3720 | | 0.388 | 0.366 |
| 0.01870 | 20 | 0.3740 | | 0.388 | 0.366 |
| 0.01880 | 20 | 0.3760 | | 0.388 | 0.366 |
| 0.01890 | 20 | 0.3780 | | 0.388 | 0.366 |
| 0.01900 | 20 | 0.3800 | | 0.388 | 0.366 |
| 0.01910 | 20 | 0.3820 | | 0.388 | 0.366 |
| 0.01920 | 20 | 0.3840 | | 0.388 | 0.366 |
| 0.01930 | 20 | 0.3860 | | 0.388 | 0.366 |
| 0.01940 | 20 | 0.3880 | MAX | 0.388 | 0.366 |
| 0.01950 | 19 | 0.3705 | | 0.388 | 0.366 |
| 0.01960 | 19 | 0.3724 | | 0.388 | 0.366 |
| 0.01970 | 19 | 0.3743 | | 0.388 | 0.366 |
| 0.01980 | 19 | 0.3762 | | 0.388 | 0.366 |
| 0.01990 | 19 | 0.3781 | NOM | 0.388 | 0.366 |
| 0.02000 | 19 | 0.3800 | | 0.388 | 0.366 |
| 0.02010 | 19 | 0.3819 | | 0.388 | 0.366 |
| 0.02020 | 19 | 0.3838 | | 0.388 | 0.366 |
| 0.02030 | 19 | 0.3857 | | 0.388 | 0.366 |
| 0.02040 | 19 | 0.3876 | | 0.388 | 0.366 |
| 0.02050 | 18 | 0.3690 | MIN | 0.388 | 0.366 |

MIN STACK HEIGHT___0.3690
MAX STACK HEIGHT___0.3880

*FIG. 14*

METHOD OF MAKING A HEIGHT COMPENSATED LAMINAR STACK

RELATED APPLICATION

This application is a continuation-in-part of application Ser. No. 08/782,985, filed Jan. 14, 1997 entitled Dimple Compensated Laminar Stack.

BACKGROUND OF THE INVENTION

1. Field of the Invention

The present invention relates generally to methods and apparatus for forming parts by the successive stacking of a number of laminas, and more particularly to such methods and apparatus for compensating for material thickness variation in the manufacture of lamination stacks.

2. Description of the Prior Art

It is well known that certain structures may be formed by the stacking of a series of laminations or laminas. For example, elements of electric motors, solenoids and transformers may be formed by this process. Typically, the laminas are blanked from continuous strip stock and then stacked and bound together to form the part being manufactured. However, due to imperfections of the strip stock, thickness variations of the strip stock often occur and may thus cause the part being formed from successive layers of the laminas to incur parallelism error (i.e., "leaning"). This parallelism error occurs because in stacking the laminas, the relatively thicker portions of the laminas are directly overlaying one another, and the relatively thinner portions of the laminas directly overlie one another. Parallelism error is depicted in prior art FIG. 1. During the stacking of the individual laminations 10, one side 12 of the stack becomes higher than the opposite side 14 of the stack, which in turn results in a leaning or bending of the stack.

Techniques have been developed in the industry for attempting to overcome this leaning condition of the stack. For example, it is known in the industry to rotate the stack for symmetrical laminas so that the relatively thicker portion of each lamina does not directly overlie or underlie the relatively thicker portion of adjacent laminas. Typically the stack is rotated 180° prior to the laying of each lamina. Of course, instead of rotating the stack, each lamina may be rotated while the position of the stack is kept constant to achieve the same result. U.S. Pat. No. 4,619,028 to Neuenschwander describes this solution to the problem associated with parallelism error.

Rotating the laminas in order to reduce the effects of parallelism error may be performed if the laminas are symmetrical. However, this rotational technique cannot be used for laminations that are not symmetrical to overcome the effects of transverse thickness variations in the laminas.

Another problem well known in the industry is the inaccuracies of the thickness of the sheet material, commonly made of steel, used to make the individual lamina. Since the stack height can be adjusted only by adding or removing laminations, this results in the stack of laminations having a height that will vary from a target height, despite either manually or automatically varying the number of laminations in the stack. Lamination stacks are commonly assembled either in the stamping die by interlocking the laminations together and also external to the die in machines made for this purpose. Both of these methods of stacking laminations are well known to those skilled in the art.

Normal small variations in the thickness of the individual lamina will be added as a function of the number of laminations in the stack, to the point of requiring the increase or decrease in the number of laminations in the stack by one lamination to remain as near to the target height as possible. Thus, with prior art lamination stacking methods and apparatus, the closest that one can get to the target height is within plus or minus one lamination thickness.

It is also generally known in the industry to provide laminas with depressions, known in the industry as "dimples". Heretofore, dimples have been provided on laminas in order to provide separation between adjacent laminas when the stacked laminas are to be annealed. Separation of the laminas during the annealing process of the stack is advantageous because it allows for the surfaces of the laminas to be in fluid communication with the ambient atmosphere during the annealing process. Heretofore, dimples have been provided upon the laminas such as by using alternating dies in which both the dies locate the dimples on alternating sides of the lamina so that the dimples do not overlie one another as described in U.S. Pat. No. 4,538,345 to Diederichs. In addition to using alternating dies, dimples have also been provided upon alternating sides of the laminas by rotating the laminas as described in U.S. Pat. No. 5,349,741 to Neuenschwander.

Methods and apparatus are needed to effectively compensate for these lamina thickness variations during the fabrication of structures by the stacking of laminations. Such methods and apparatus should be capable of being utilized in connection with symmetrical as well as nonsymmetrical laminas.

SUMMARY OF THE INVENTION

A method and apparatus is provided for manufacturing laminated parts from a plurality of laminas. The laminas for forming the laminated parts are blanked from strip stock material and are then stacked to form the laminated part. The present method and apparatus compensates for variations in the transverse thickness in such laminas. Laminas that are symmetrical as well as nonsymmetrical in their planar shape may be employed in connection with the present method and apparatus. In this way, the need to rotate the laminas as well as the mechanisms required for such rotation are eliminated.

As a general overview, the present preferred method and apparatus provides a means of overcoming the thickness variation of individual lamina used to make a lamination stack by measuring that thickness variation, and, through a control means, raising protuberances at predetermined locations on a variable number of laminations as they are stamped in a die made for that purpose. Those protuberances, or dimples, interact with the adjacent laminations to slightly increase the effective thickness of a varying number of the laminations, permitting the stack height to be adjusted by less than the thickness of one lamination. The invention can be used on all laminations regardless of shape or purpose.

A method of manufacturing laminated parts from a plurality of laminas, wherein the laminas for forming a laminated part are blanked from strip stock material and are then stacked to form the laminated part, comprises the steps of inputting into a controller a value for the desired stack height, measuring the thickness of the strip stock and dividing the desired stack height value by the strip stock thickness measurement. An integer number of laminations required to build the lamination stack is then derived. An actual stack height is computed by multiplying the strip stock thickness measurement with the derived integer value. The actual stack height is subtracted from the desired stack height to provide a difference value. This difference value is divided by a predetermined protuberance height to provide the number of laminations in the stack to compensate with a protuberance, and a protuberance is provided upon selected sections of said strip stock on the number of compensated laminations to provide a laminated part substantially equivalent to the desired stack height value.

As is well known in the industry of progressive dies, the strip stock is indexed forward through the dies, so that successive sections of the strip stock are punched. The strip stock is indexed forward an amount roughly equal to the length of a lamination following each stroke of the stamping tool. It is preferred that the measuring device measures the thickness of the strip stock at roughly the same increments along the length of the strip stock as the strip stock is advanced for each lamination. Therefore, the lengths of the strip stock at which the measurements are taken correspond to successive sections of the strip stock.

The desired lamination stack height is inputted and stored in the controller as is the dimple height. Next, the thickness value is measured for the first section of strip stock. Since the thickness of the strip stock is relatively constant for at least a portion of the strip, the number of laminations required to form a laminated part of the desired height is computed by dividing the desired stack height by the thickness value. If this number is an integer, no compensation is needed; however, if it is a real number it is rounded down to the integer value. The integer value is multiplied by the thickness value to provide an actual stack height value, which is then subtracted from the desired value to provide the difference value. The difference value is divided by the dimple height, the integer value of which equals the number of laminations in the stack in which the section of strip stock is to be provided with dimples.

By adding these small protrusions to the planar shape of the lamination, the effective thickness of a given number of laminations can be increased so that the overall stack height is increased by the height of the dimple, multiplied by the number of laminations so altered in the stack. In this way, the stack height can be altered by less than one lamination thickness, and the tolerance for the overall stack height is thus determined by the height of the dimple, which can be on the order of 0.003 inches.

The present system is comprised of a measuring device to measure the thickness of the strip stock. The measuring device preferably consists of measuring probes placed in line with the outer sides of the strip stock prior to the stamping tool. The measuring probes are preferably linear variable differential transducers. The system also includes a controller which receives the desired stack height and predetermined dimple height values, the output from the measuring device, and computes the actual stack height to provide the difference value. The system further includes slide operated punches in a lamination stamping tool.

When the number of laminations to be punched with the dimples has been determined, and the preferred location within the stack is located, a signal is sent by the controller to the slide operated punches. The punches are normally maintained in the retracted position so that when the stamping tool performs its stamping movement, the punches do not create protuberances in the strip stock. Upon receipt of a signal from the controller, the punches are moved into the extended position. The slide operated punches are placed in the die at an appropriate point in the progression so that when in the extended position, the punches will form protuberances selectively on the strip stock.

The protuberances will be formed in the strip stock and the punches will then return to the retracted position, so that subsequent sections of strip stock will not receive a protuberance. As is understood in the progressive die industry, adjacent sections of strip stock will be cut into laminations which will be stacked adjacent to one another in the lamination stack. In this way, one lamination having protuberances will abut with adjacent laminations that do not have protuberances, spacing them sufficiently to overcome the thickness variation over a number of laminations.

The objects and advantages of the invention will become apparent from the following description of certain present preferred embodiments taken in conjunction with the attached drawings and the appended claims.

BRIEF DESCRIPTION OF THE DRAWINGS

FIG. 14 is a table representative of typical lamination stack height variations that can be compensated for by the method and apparatus of the present invention.

DETAILED DESCRIPTION OF THE PREFERRED EMBODIMENT

The preferred embodiments disclosed herein relate to a method and apparatus for manufacturing laminated parts from a plurality of laminas. The laminas for forming the laminated parts are blanked from strip stock material and are then stacked to form the laminated part. Such stacking of laminas to form laminated parts is generally well known.

As a general overview, one method to compensate for parallelism error involves measuring the thickness of the strip that becomes the laminas at a first location of the strip and measuring the thickness of the strip at a second location. The first location is preferably a point along the front side of the strip and the second location is preferably a point along the rear side of the strip. Next, the difference between the thickness values at the first location and the second location is computed at points along the strip stock that will become each lamina. The sum of the thickness difference values between the first and second locations is then computed for successive measurements. Then, a protuberance or dimple is provided in a lamina at one or more locations when the sum of the thickness difference values equals or exceeds some predetermined value.

The protuberances are provided on the laminas to compensate for the difference in thickness between one location or side of the laminas and another location. For example, when the sum of the measured difference values equals or exceeds the predetermined difference value and the thickness values at the rear of the strip forming the laminas are greater than the thickness values at the front of the strip, a protuberance is provided on the front of the lamina strip. Preferably, the protuberance has a depth equal to the predetermined difference value.

Figure 1:
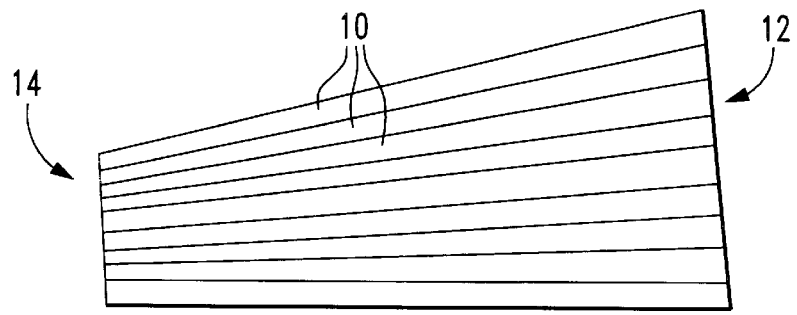
FIG. 1 is an exaggerated enlarged fragmentary elevational view of a prior art conventional stack of laminas having variations in their transverse thickness.
Figure 2:
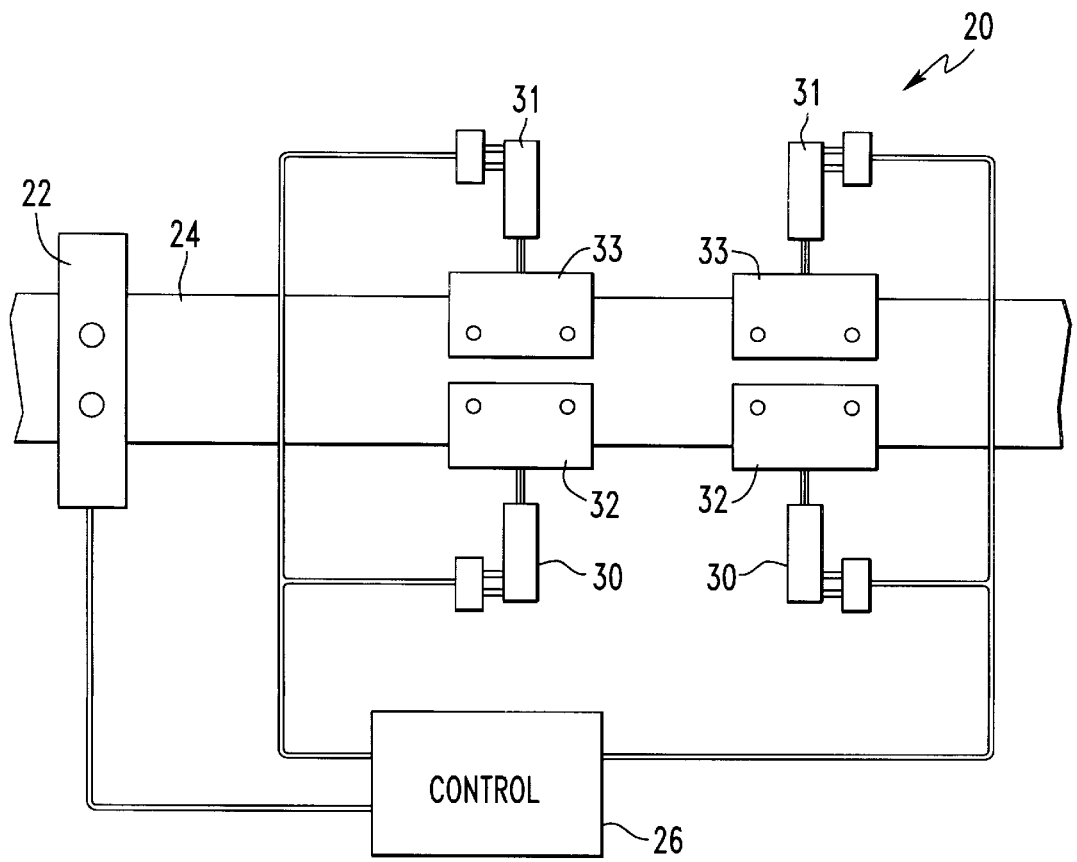
FIG. 2 is a schematic depiction of a system for compensating laminar stacks for parallelism error.

Referring first to FIG. 2, the strip stock 24 is depicted, wherein each individual lamination will be cut from the strip stock 24 once the pattern for that lamination is made on the strip stock 24. The present system 20 includes a measuring device 22 to measure the thickness of the strip stock at certain locations along the strip stock 24 that will correspond to locations of each lamina. The measuring device 22 preferably consists of measuring probes placed in line with the opposite sides of the strip stock, referred to herein as the "front" 40 and the "rear" 42 of the strip stock, prior to the stamping tool. The measuring probes are preferably linear variable differential transducers, such as model GCD 121-125 made by Schaevitz.

The system 20 also includes a controller 26 which receives the output from the measuring device 22, sums that output and compares it to a predetermined differential value. The controller 26 is preferably a computer or Programmable Logic Controller. The controller 26 is preprogrammed to accept a value relating to the acceptable tolerance for the "lean" or parallelism of the lamination stack. A value representing the depth of the protuberance is available to the controller 26 as a fixed or variable function depending on the method used to establish the depth of the protuberance. If the depth of the protuberance is variable, another value representing the allowable gap or number of spacings per stack is entered. The differential thickness is added algebraically until the value equals or exceeds the height of the protuberance at which time the controller 26 sends a signal causing the slide operated punches 28 or 29 on the front 40 or rear 42 half of the strip stock 24 to extend.

The present system 20 further includes slide operated front and rear punches in a lamination stamping tool (the punches and stamping tool are not shown in FIG. 2 and are well-known technology), which will be described in greater detail below. As can be seen in FIG. 2, the present system 20 includes one or more front air valve and cylinders 30 operatively connected to respective front actuating wedges 32 (two front air valve and cylinders 30 are shown in FIG. 2, each operatively connected to a respective front actuating wedge 32). The front air valve and cylinders 30 and the front actuating wedges 32, in combination, can actuate the front punches to create a protuberance or protuberances upon the lamination stock 24, as will be described in greater detail below. The front air valve and cylinders 30 and the front actuating wedges 32 are operatively connected to the controller 26 so that they can be actuated upon receipt of an appropriate signal from the controller 26. The front punches are sized, configured and positioned relative to the stamping tool so as to impress a protuberance upon the lamination stock 24 when appropriately actuated.

As can also be seen in FIG. 2, the present system 20 further includes one or more rear air valve and cylinders 31 operatively connected to respective rear actuating wedges 33 (two rear air valve and cylinders 31 are shown in FIG. 2, each operatively connected to a respective rear actuating wedge 33). The rear air valve and cylinders 31 and the rear actuating wedges 33, in combination, can actuate the rear punches to create a protuberance or protuberances upon the lamination stock 24, as will be described in greater detail below. The rear air valve and cylinders 31 and the rear actuating wedges 33 are operatively connected to the controller 26 so that they can be actuated upon receipt of an appropriate signal from the controller 26. The rear punches are sized, configured and positioned relative to the stamping tool so as to impress a protuberance upon the lamination stock 24 when appropriately actuated.

Figure 3:
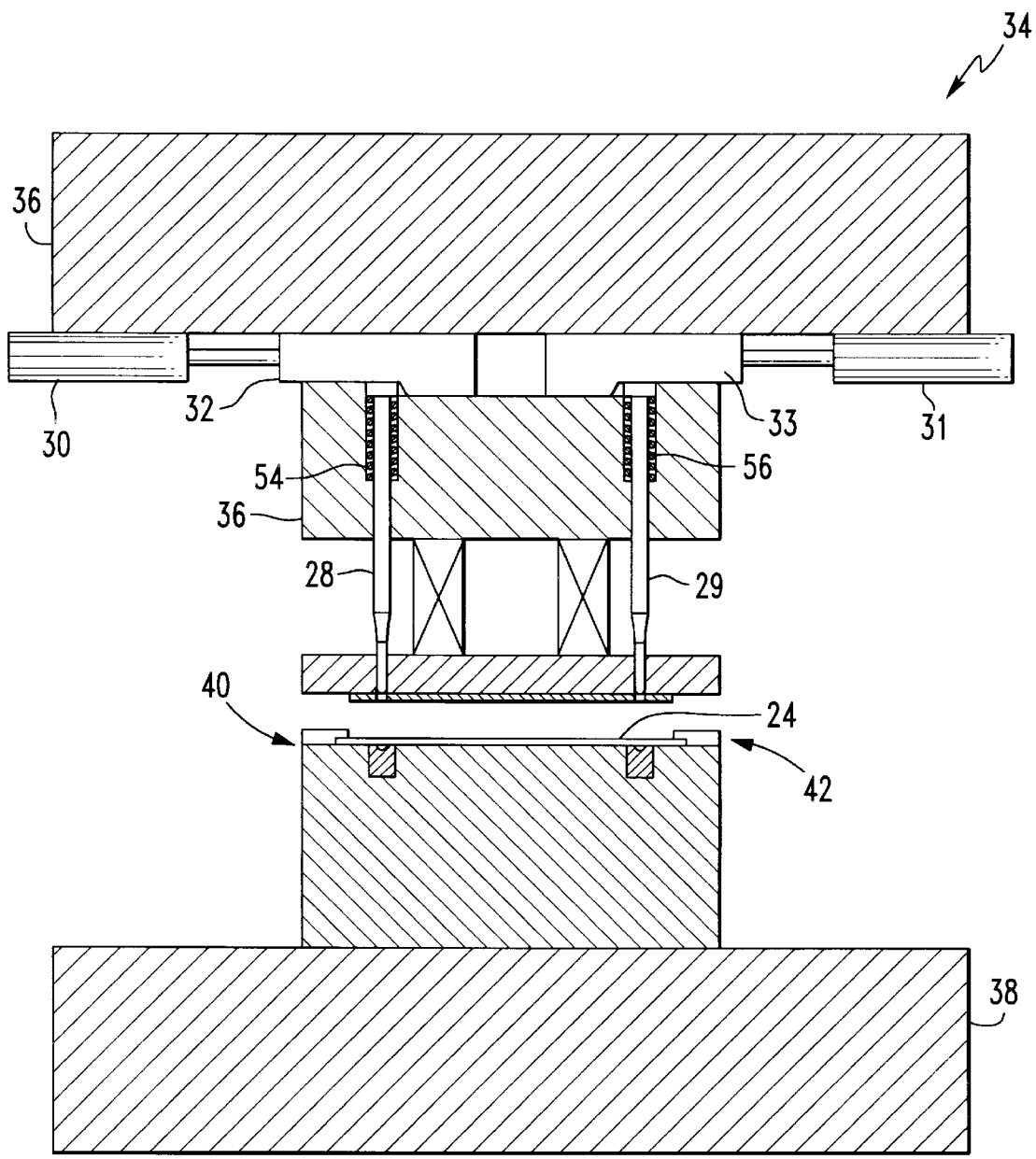
FIG. 3 is a cross-sectional view of a stamping tool used in connection with the system, in which the punches are shown in the retracted position.
Figure 4:
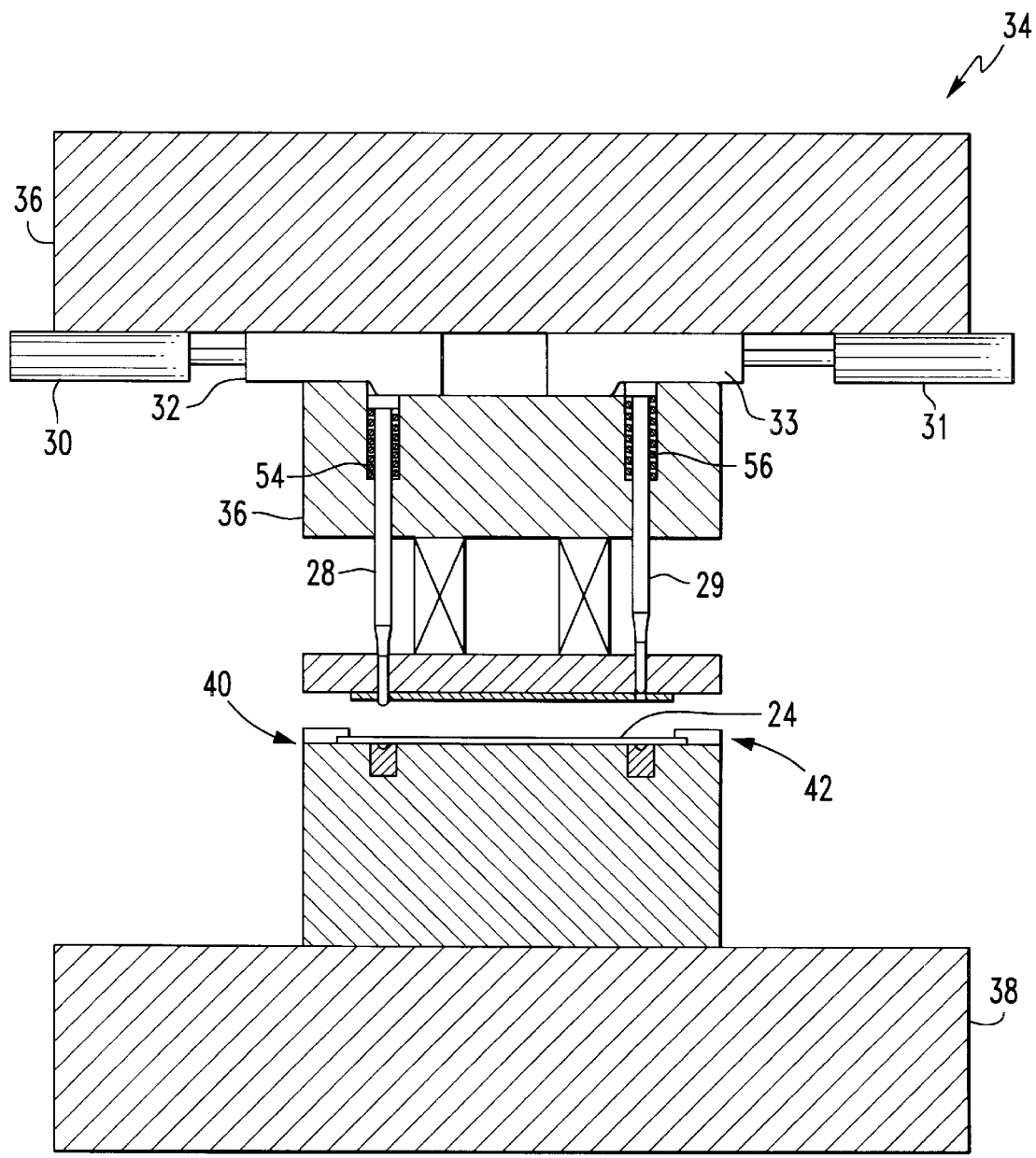
FIG. 4 is a cross-sectional view of a stamping tool used in connection with the system in which the front punch is shown in the extended position.

Referring next to FIGS. 3 and 4, the operation of the stamping tool 34 and the punches will be described. Referring first to FIG. 3, a cross sectional view of the stamping tool 34 is shown. The stamping tool 34 has an upper portion 36 as well as a lower portion 38. The strip stock 24 is also shown and would move toward the viewer viewing FIG. 3. It is customary in the industry to designate the side of the stamping tool 34 and the strip stock 24 indicated as reference numeral 40 in FIG. 3 as the "front" of the lamination stock 24 and stamping tool 34. Likewise, it is also customary in the industry to designate the side of the stamping tool 34 and the strip stock 24 indicated as reference numeral 42 as the "rear."

As can be seen in FIGS. 3 and 4, one or more front punches 28 and one or more rear punches 29 are shown incorporated into the stamping tool 34. Preferably, punches 28, 29 are movably disposed through a portion of the stamping tool 34, as described herein. The front air valve and cylinders 30 and the front actuating wedges 32 as well as the rear air valve and cylinders 31 and the rear actuating wedges 33 are also operatively incorporated within the stamping tool 34.

The front air valve and cylinder 30 may cause or otherwise enable the front actuating wedge 32 to be moved forward to the position shown in FIG. 3. When the actuating wedge 32 is in the position shown in FIG. 3, the front punch 28 does not extend out of the upper portion 36 of the stamping tool 34 and the front punch 28 is said to be in the retracted position. It is preferred that the front punch 28 is biased by one or more springs 54 so as to be maintained in the retracted position in the absence of external forces. Therefore, when the stamping tool upper portion 36 is forced downward by a suitable press ram, the front punch 28 will not contact the strip stock 24.

The rear air valve and cylinder 31 may also cause or otherwise enable the rear actuating wedge 33 to be moved forward with respect to the rear actuating wedge 33. Thus, the rear actuating wedge 33 may be moved into a position, as shown in FIG. 3 in which the rear punch 29 does not extend out of the upper portion 36 of the stamping tool 34 and the rear punch 29 is said to be in the retracted position. It is preferred that the rear punch 29 is biased by one or more springs 56 so as to be maintained in the retracted position in the absence of external forces.. Therefore, when the stamping tool upper portion 36 is forced downward by a suitable press ram, the rear punch 29 will not contact the strip stock 24.

Referring next to FIG. 4, it will be demonstrated how either or both of the front and rear punches 28, 29 may be extended outward from the stamping tool upper portion 36. As shown in FIG. 4, the front air valve and cylinder 30 causes the front actuating wedge 32 to be moved linearly so that a relatively thicker portion of the actuating wedge 32 overlays and contacts the front punch 28. Such contact by the front actuating wedge 32 with the front punch 28 forces the front punch 28 downward so that a portion of the front punch 28 extends outward from the stamping tool upper portion 36. While in this extended position, the front punch 28 will contact strip stock 24 when the stamping tool upper portion 36 is forced downward by a suitable press ram.

Thus, when the predetermined differential value is met or exceeded by the sum of the differential values, as measured by the measuring device 22, a signal is sent by the controller 26 to the front set or the rear set of slide operated punches 28, 29. The punches 28, 29 are normally maintained in the retracted position. Upon receipt of the signal from the controller 26, the punches 28, 29 are moved into the extended position. The slide operated punches 28, 29 are placed in the die at an appropriate point in the progression so that when in the extended position, the punches 28, 29 will form protuberances selectively on the front or rear half of the planar lamination.

It is distinctly understood that either or both of the front and rear punches 28, 29 as well as the air valves and cylinders 30, 31 and actuating wedges 32, 33 may be placed in either of the stamping tool upper portion 36 or the stamping tool lower portion 38. It is likewise distinctly understood that although it is preferred that a press ram move the stamping tool upper portion 36 downward into stamping contact with the strip stock 24, it is likewise possible to configure the stamping tool 34 so that the stamping tool lower portion 38 is moved upward so that the strip stock 24 is moved into stamping contact with either of the front or rear punches 28, 29.

As is generally understood in the progressive die industry, the strip stock 24 is preferably indexed forward following each stroke of the stamping tool. Thus, successive sections of the strip stock are punched by a particular die.

Figure 5:
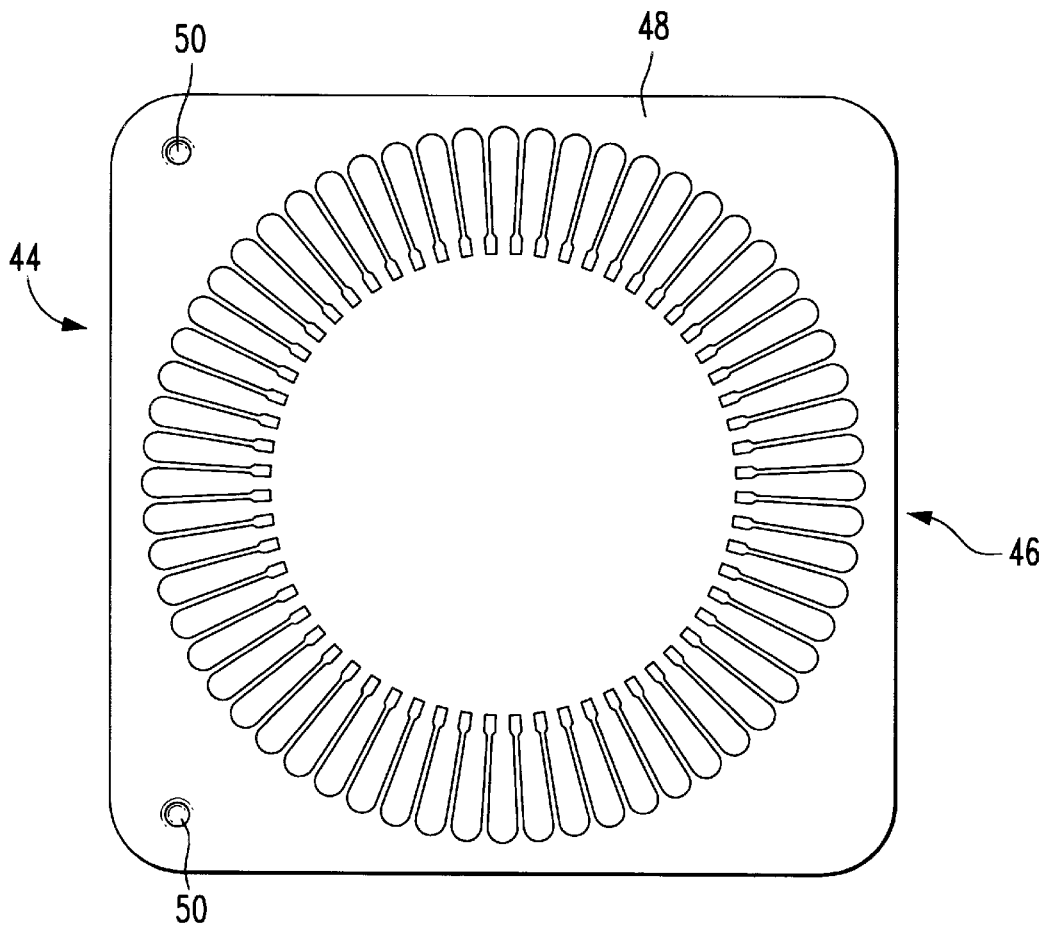
FIG. 5 is a top elevational view of a lamination having dimples formed thereof in accordance with the parallelism compensating system.

A stamped, cut lamination 48 is shown in FIG. 5. The designations of the "front" and "rear" are maintained with respect to the lamination 48 and the front of the lamination 48 is designated as 44 while the rear of the lamination 48 is designated as 46. The lamination 48 includes two protuberances 50 disposed along the front 44 of the lamination 48. Thus, the strip stock from which the lamination 48 was formed had a relatively thinner front side 44 than a rear side 46.

Figure 6:
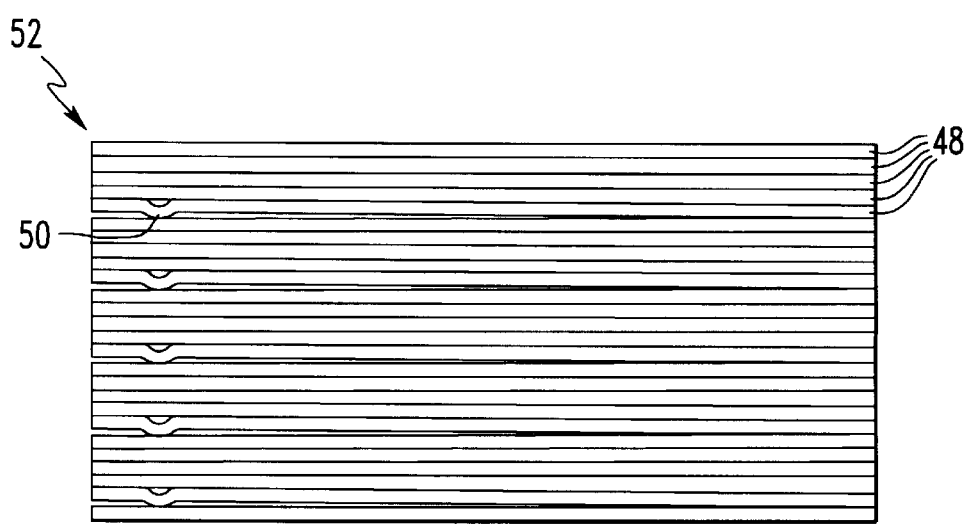
FIG. 6 is a stack of laminations showing protuberances on selected laminations to compensate for parallelism error.

Referring next to FIG. 6, a stack 52 of laminations 48 is shown. As can be seen in the Figure, the protuberances 50 formed on selected laminations 48 cooperate with adjacent laminations to raise the portion of the lamination stack 52 having the protuberances 50. Again, the strip stock from which the laminations 48 were formed had relatively thinner front sides 44 than rear sides 46.

Figure 7:
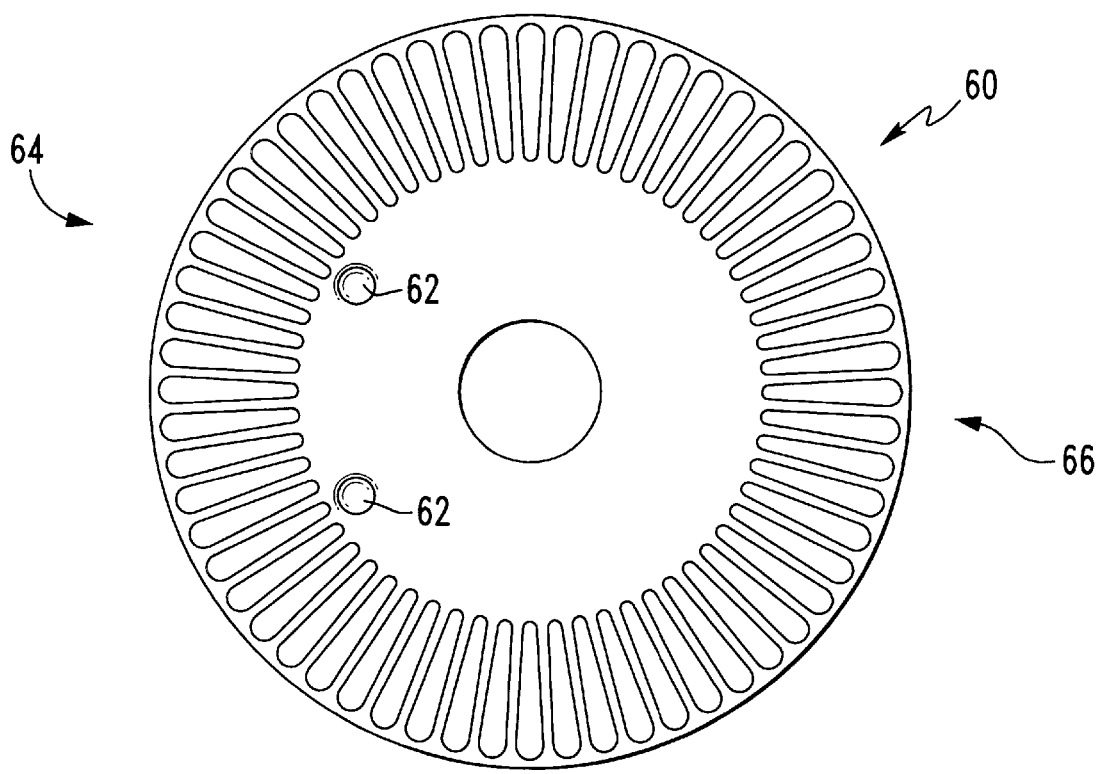
FIG. 7 is a top view of a lamination showing protuberances formed thereon in accordance with the system.

Referring next to FIG. 7, another lamination 60 is shown. Here, protuberances 62 are again provided on the front side 64 of the lamination 60. Thus, the front side 64 of the lamination 60 is relatively thinner than the rear side 66 of the lamination 60.

Figure 8:
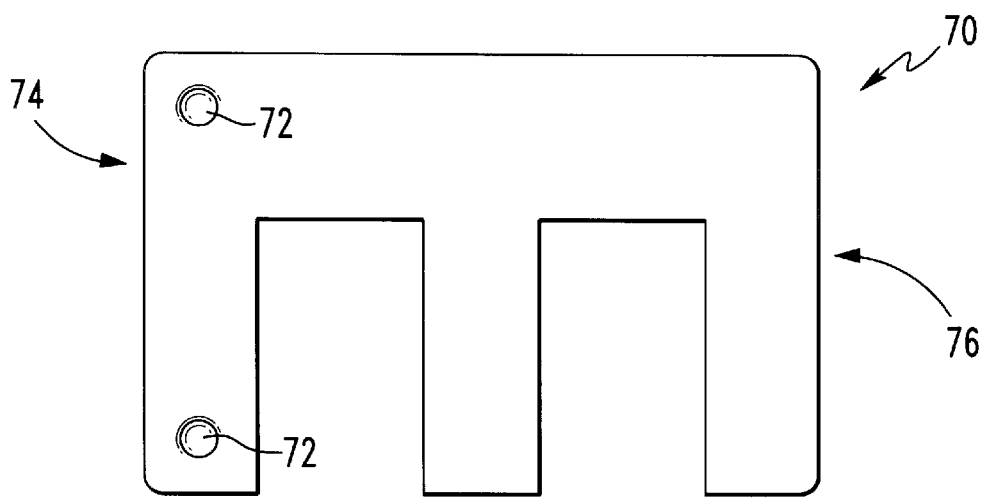
FIG. 8 is a lamination showing protuberances formed thereon in accordance with the system for compensating for parallelism error.

Referring next to FIG. 8, yet another lamination 70 is shown. The lamination 70 is not symmetrical. Nonetheless, the present invention may be employed with respect to the asymmetrical lamination 70. Protuberances 72 are provided on the front side 74 of the lamination 70 Thus, the front side 74 of the lamination 70 is relatively thinner than the rear side 76 of the lamination 70.

Any number of punches may be utilized in connection with the present invention. Likewise, any number of measurements may be taken along the length or along the width of the strip stock. Thus, for example, stamping tools that produce multiple parts across the transverse direction of the strip stock ideally would use thickness measurement at two points on each part. However, the thickness values could be averaged over the width of the transverse dimension if desired.

Figure 9:
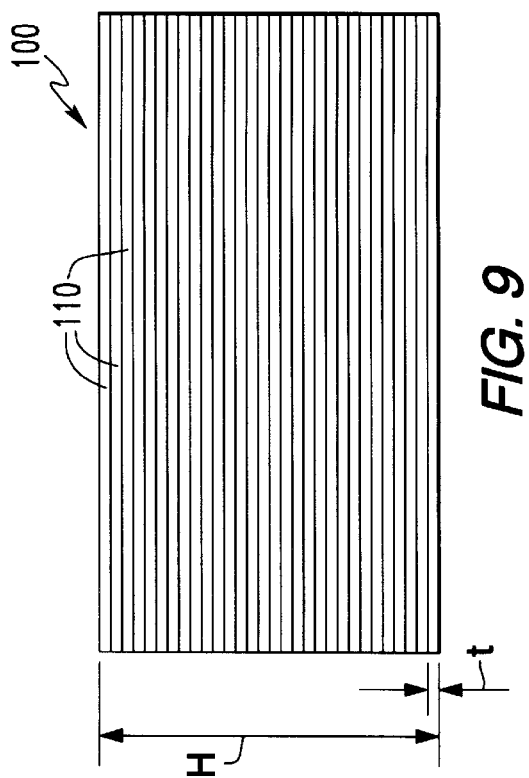
FIG. 9 is a cross sectional view of a stack of laminations of a specified height as compared to the individual lamination thickness.
Figure 12:
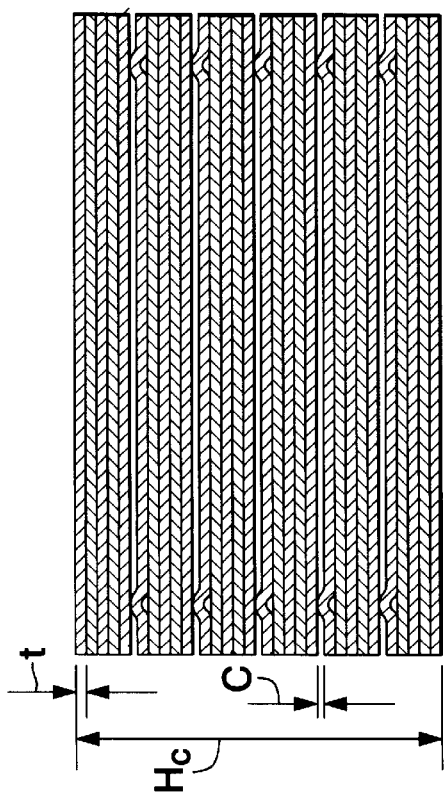
FIG. 12 is a stack of laminations showing protuberances on selected laminations in order to substantially reach the desired height in accordance with the present invention.
Figure 13:
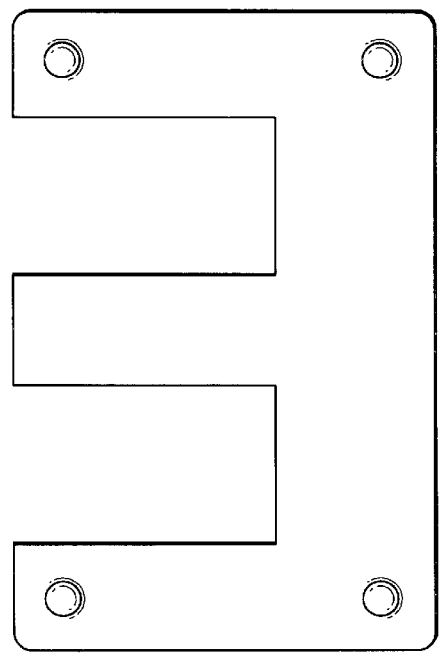
FIG. 13 is a top elevational view of a lamination having dimples formed therein in accordance with the present invention.
Figure 10:
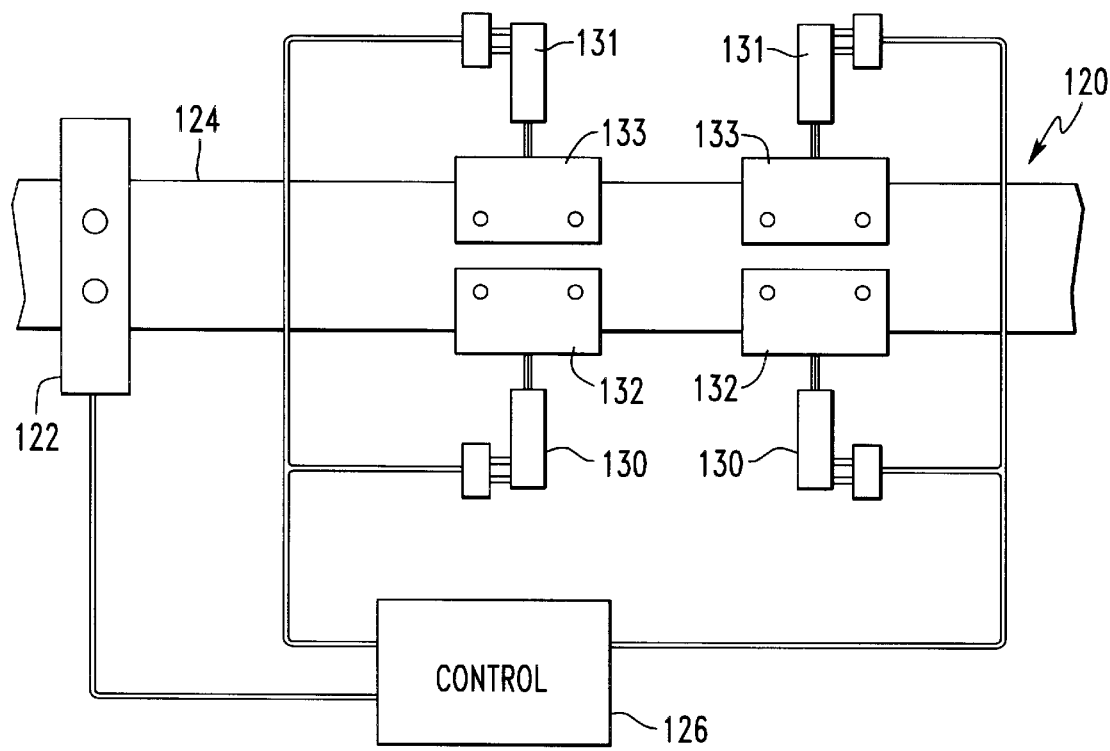
FIG. 10 is a schematic depiction of the present system for height compensated laminar stacks.
Figure 11:
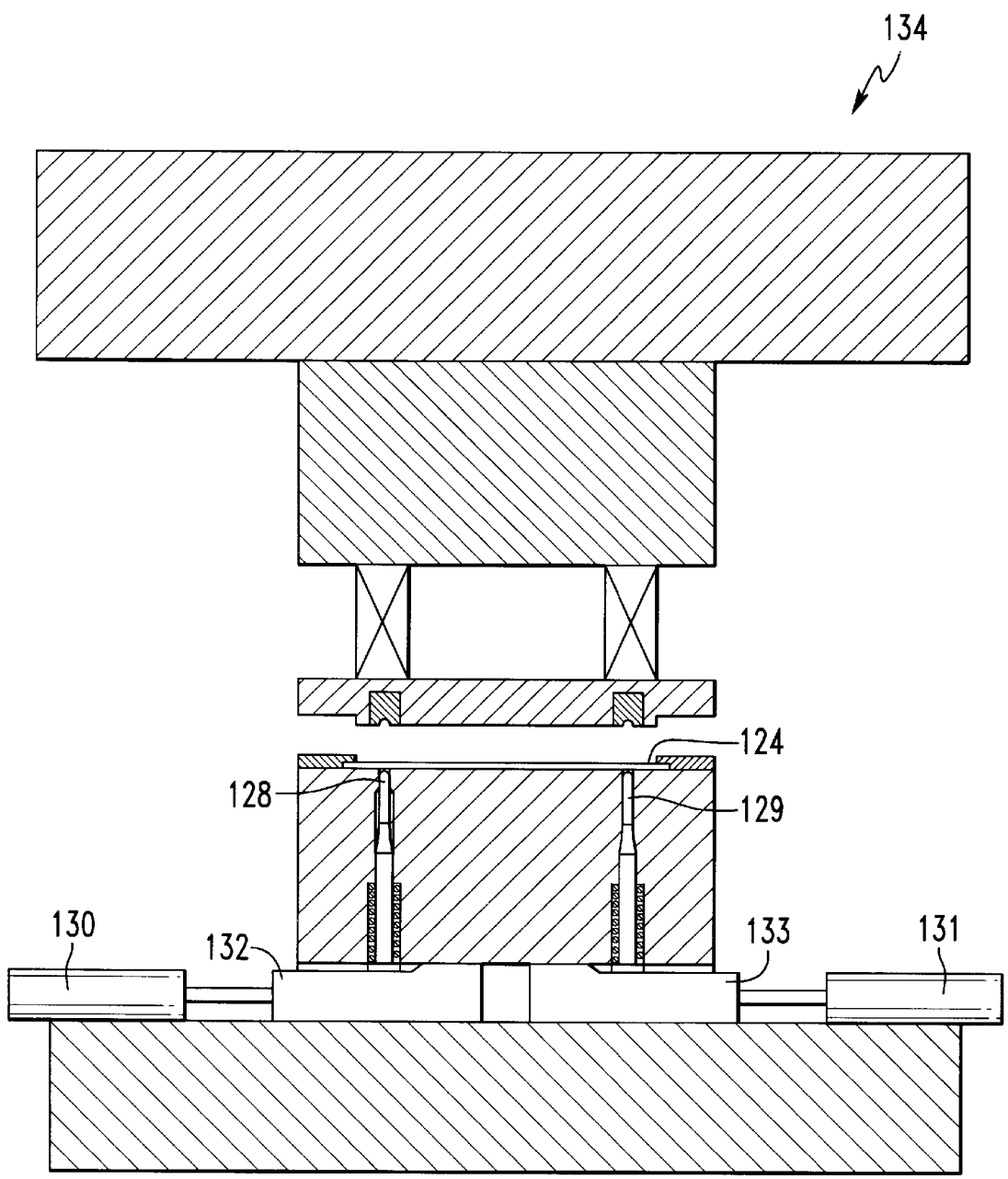
FIG. 11 is a cross sectional view of a stamping tool used in connection with a preferred system in which the punches are shown in the lower portion of the die.

Referring now in detail to FIGS. 9–14, the present invention of a method and apparatus for compensating for strip thickness variation in the manufacture of lamination stacks will be described in detail. FIG. 9 shows a cross sectional view of a stack of laminations 100 of a specified height (H) as compared to an individual lamination 110 thickness (t). A lamination stamping tool as shown in FIGS. 10 and 11 includes a thickness measuring device 122, control means 126 and tool elements (130–133) which are activated on a signal provided by the controller. The measuring device preferably consists of linear variable differential transducers (such as Model GLD 121-125 made by Schaevitz) placed in line with the strip stock 124 prior to the stamping tool 134. The desired target stack height is inputted into the controller, as well as a protuberance, or dimple, height (C). As the strip stock is passed through the apparatus, the controller receives the output from the measuring device and compares it to the target stack height (H). By dividing the target stack height by the lamination thickness (t), the number of laminations ($n_t$) required to achieve the stack height within a specified tolerance is determined. If this number has a decimal component, it is rounded down to an integer or whole value ($n_a$). The thickness value (t) is multiplied by the integer value ($n_a$) to compute an actual stack height (h). The actual stack height (h) is subtracted from the desired target stack height (H) to provide a difference value (D). Dividing the difference value (D) by the known height of the protuberance (C) results in the number of laminations in the stack that must be altered (N) with the protuberances in order to more closely approach the target stack height within the thickness of one lamination, and preferably within the thickness of the protuberance height to provide a lamination stack of a compensated height ($H_c$) substantially equivalent to the target stack height (H). See, for example, FIGS. 12 and 13.

The table in FIG. 14 shows the variations in stack height that can result in typical tolerances provided in lamination thickness. As shown by way of an example, a lamination has a nominal thickness of 0.0185 inches, with the normal material tolerance of plus or minus 0.002 inches. Thus, lamination thickness can range between 0.0165 inches and 0.2050 inches. At the minimum lamination thickness, 23 laminations would be required to provide an actual stack height of 0.3795 inches, when the nominal target maximum is 0.388 inches and the minimum is 0.366 inches. At the maximum lamination thickness of 0.2050 inches, only 18 laminations are required to provide a stack height of 0.3690 inches. Thus, there can be a variation of up to 5 laminations within the nominal stack height.

In accordance with the present invention, the control means accepts a value relating to the acceptable tolerance for the height of the lamination stack. Using the table of FIG. 14 as an example, the maximum height of 0.3880 and the minimum height of 0.3690 inches is input into the control means. The thickness of the steel strip stock 124 is measured on at least the first stroke, and preferably on each stroke, of the die by the measuring device 122. The value representing the height of the protuberances is entered into the controller; preferably the height (C) of the protuberance or dimple is 0.003 inches. Another value representing the target stack height (H) is entered. The controller divides the measured lamination thickness value (t) into the inputted target stack height (H) to determine the number of laminations ($n_t$) in the stack. This value of ($n_t$) is rounded down to the nearest whole integer to arrive at the whole number ($n_a$). The integer value ($n_a$) is multiplied by the thickness value (t) to determine the actual stack height (h). The actual stack height (h) is subtracted from the target stack height (H) to determine the difference value (D). The controller then divides the height of the protuberance (C) into the difference value (D) to determine the integer number of corrections (N) required to adjust the height of the lamination stack to within a tolerance equal to or less than the height of the protuberance (C). The control means then takes the value of the actual number of laminations in the stack ($n_a$) and divides that value by the number of corrections (N) to determine the number of laminations per correction (S).

The control means receives a signal from the die on each stroke. At the calculated correction stroke (S), the controller sends a signal to the solenoid operated air valves 130, 131 which operate the air cylinders and slides 132, 133 to activate the tooling elements to form the dimples. The die punches 125, 129 such as one at each corner of a rectangular or square lamina (FIG. 13), are activated for one die stroke and are then deactivated until the controller again counts the number of strokes until the correction stroke (S) is reached and the cycle is repeated. Although the lamination thickness is relatively constant for a given stack height, the thickness value (t) can be updated at regular intervals to accommodate changes in the material's thickness that are inherent in the material manufacturing process, as explained in more detail below.

The invention will be more particularly described, by way of example only, in referring to the table of FIG. 14 wherein the lamination thickness (t) is measured to be 0.01940 inches. It is assumed for the purposes of this example that the lamination thickness is constant. In referring to the table, it can be seen that 20 laminations would provide a stack height of 0.3880 inches, which is the maximum stack height that can be provided. However, if the desired nominal stack height (H) is 0.3781 inches, the present invention can provide a compensated stack height ($H_c$) that is much closer to this desired target stack by using only the minimum number of laminations and compensating for the lamination thickness by providing dimples at selected laminations within the stack. In this example, the height of the protuberance is assumed to be 0.003 inches, which value represents (C). The target stack height (H) is entered into the control means as 0.3781 inches. The total number of laminations ($n_t$) in the target stack height is equal to 0.3781 divided by 0.01940, or 19.4897 ($n_t$=H/t). This is rounded down to the next whole number ($n_a$) for the integer number of laminations in the target stack, which in this example is 19. The actual stack height (h) is equal to the integer number multiplied by the measured thickness value or 19 multiplied by 0.01940 which equals 0.3686 inches (h=$n_a$×t). The difference (D) between the actual and target stack heights is equal to 0.3781 minus 0.3686 which equals 0.0095 inches (D=H−h). The number of corrections (N) required is equal to this difference value divided by the dimple height (C) or 0.0095 divided by 0.0030 which is approximately equal to 3.1667; this is rounded down to the whole number 3 (N=D/C). Thus, the die strokes (S) between tool element activation to provide the protuberance on a selected lamination is equal to 19 divided by 3 which is approximately equal to 6 (S=$n_a$/N). Accordingly, laminations 6, 12 and 18 will be provided with the protuberance of 0.0030 inches. Thus, in this example, a lamination stack comprising a total of 19 laminations each having a nominal thickness of 0.0194 inches has 3 laminations within the stack having dimples therein of 0.0030 inches each for an added height of 0.0090 inches such that the final compensated stack height ($H_c$) now becomes 0.3776 inches (0.3686+0.0090), which is much closer to the desired target stack height (H) of 0.3781 inches rather than that which could be provided by providing 20 laminations to arrive at the maximum stack height of 0.3880 inches. Thus, the tolerance of the stack height with the present invention is minus 0.0005 inches (0.3781−0.3776) as opposed to the plus 0.0099 inches (0.3880−0.3781) that would be provided by the prior art.

As mentioned above, this provides a significant advantage to the end user of the lamination stacks, such as the makers of electrical motors, solenoids or transformers, in that the finished product can be substantially equivalent to the electrical and other characteristics of the desired product. Moreover, since only 19 laminations are utilized rather than 20, the material cost of a particular lamination stack can be decreased in that less laminations are required to provide the desired nominal stack height.

In the previous example, laminations 6, 12 and 18 were provided with the dimples to provide the final stack height. Since there are a total number of 19 laminations in the stack, the correction value (S) can be changed such that a dimple is not provided towards either end of the stack. For example, if desired, rather than laminations 6, 12 and 18, the protuberances could be provided at laminations 4, 10 and 16 such that the dimple is not provided towards either end of the lamination stack.

In another preferred embodiment of the present invention, the controller continuously computes the running sum of the stack height during the stacking of the individual laminas so as to compensate for changes in the measured thickness value (t). For the purposes of this example, it will be assumed that after the eighth lamination has been added to the stack the thickness value changes to 0.01960 inches from the previously described 0.01940 inches. The controller, since it keeps a running total of the stack height, would have stored therein a value of 0.1582 inches. This is equal to eight laminations at 0.0194 inches (0.1552 inches) plus a previously provided dimple of 0.0030 inches placed at lamination number 6 (or lamination 4). Since the thickness measurement changes to 0.01960, the controller would calculate a remaining target stack height value of 0.2199 inches (0.3781 inches minus 0.1582 inches). The remaining number of laminations needed to complete the stack is then computed by the controller. The remaining number is equal to 0.2199 divided by 0.01960 which is approximately equal to 11.22 laminations; this value being rounded down to the next whole number of 11 laminations. The thickness of these 11 laminations would total 0.2156 inches (11×0.01960). This results in an actual stack height of 0.3738 inches (0.1582 inches+0.2156 inches), resulting in a new difference value of 0.0043 inches (0.2199−0.2156 or 0.3781−0.3738). At a dimple height of 0.003 inches the number of remaining compensated laminations is equal to 1.433 (0.0043 divided by 0.003). Thus, one lamination needs to be provided with a protuberance in order to provide for the compensated stack height. Since there are 11 laminations remaining, at lamination 13 the controller sends a signal to the slide operated punches to provide dimples therein such that the final stack height is now 0.3768 inches (0.3738+0.0030), which represents a tolerance of minus 0.0013 inches.

In another embodiment of the present invention, parallelism error (leaning) can also be compensated for while compensating for lamination thickness variations. If the measuring device also determines that the strip stock is of different thicknesses on opposite sides of the stock, the measuring device can also control the stamping tool such that only one side of the stamping tool provides dimples to the lamination within the stack. In this example, the thicker side of the lamina is preferably used as the thickness value (t).

If the predetermined differential value for parallelism error is met or exceeded by the sum of the measured values, the signal is sent to the controller to only operate one set of the slide operated punches. Alternatively, different size dimples can be provided on the front and rear sides of the lamina. While compensating for the variations in the nominal thickness of the lamination, if the thickness of the strip stock is greater on one side than the other, the controller can send a signal to the punches such that one set of punches 128 provides the protuberance of the desired height compensating thickness, in the above example 0.0030 inches, while the other set of punches 129 can be directed to provide a dimple of, for example, 0.0040 inches such that the parallelism error can also be corrected. Thus, in this embodiment, the controller computes a first difference value for the parallelism error and a second difference value for the height compensation function.

While certain present preferred embodiments have been shown and described, it is distinctly understood that the invention is not limited thereto but may be otherwise embodied within the scope of the following claims.

I claim:

1. A method of manufacturing laminated parts from a plurality of laminas, wherein the laminas for forming a laminated part are blanked from strip stock material and are then stacked to form the laminated part, the method comprising the steps of:

(a) providing a desired stack height value;

(b) measuring a value of thickness of said strip stock;

(c) deriving an integer number of laminations by dividing the desired stack height value by the thickness value to provide a number of laminations to form the laminated part;

(d) computing an actual stack height value by multiplying the thickness value of step (b) by the integer number of laminations in step (c);

(e) subtracting the actual stack height value of step (d) from the desired stack height value of step (a) to provide a difference value;

(f) providing a predetermined protuberance height;

(g) dividing the difference value of step (e) by the protuberance height to provide a number of compensated laminations; and (h) providing a protuberance, upon selected sections of said strip stock at the number of compensated laminations to provide a laminated part substantially equivalent to the desired stack height value.

2. The method of manufacturing laminated parts of claim 1 wherein said integer value of step (c) further comprises the steps of dividing the desired stack height value by the thickness value to provide a real number of laminations to form the laminated part and subtracting a decimal portion thereof to derive the integer number.

3. The method of manufacturing laminated parts of claim 1 further comprising the step after step (h) of (i) separating said strip stock sections into laminas.

4. The method of manufacturing laminated parts of claim 3 further comprising the step after step (i) of stacking said laminas to form the laminated part.

5. The method of manufacturing laminated parts of claim 1 further comprising the step prior to step (h) of separating said strip stock sections into laminas.

6. The method of manufacturing laminated parts of claim 5 further comprising the step after step (h) of stacking said laminas to form the laminated part.

7. A method of manufacturing laminated parts from a plurality of laminas, wherein the laminas for forming a laminated part are blanked from strip stock material and are then stacked to form the laminated part, the method comprising the steps of:

(a) providing a desired stack height value;

(b) measuring a first value of thickness of a plurality of successive sections of said strip stock at a first location of said sections;

(c) measuring a second value of thickness of said sections of strip stock at a second location of said sections;

(d) computing a first difference value between the first and second thickness values;

(e) deriving an integer number of laminations by dividing the desired stack height value by a selected one of said first or second thickness values to provide a number of laminations to form the laminated part;

(f) computing an actual stack height value by multiplying said selected one of said first or second thickness value by the integer number of laminations in step (e);

(g) subtracting the actual stack height value of step (f) from the desired stack height value of step (a) to provide a second difference value;

(h) computing a running sum of said first difference values in step (d) for said sections of strip stock;

(i) comparing said summed difference values computed in step (h) to a predetermined value;

(j) providing a first predetermined protuberance height and a second predetermined protuberance height;

(k) dividing the second difference value of step (g) by the second predetermined protuberance height to provide a number of height compensated laminations;

(l) providing a first protuberance at said first selected locations upon selected sections of said strip stock when said first difference values determined in step (h) equals or exceeds said predetermined value; and (m) providing a second protuberance at said second selected locations upon said selected sections of said strip stock at the number of compensated laminations to provide a laminated part substantially equivalent to the desired stack height value.

* * * * *